US007144470B2

(12) United States Patent
Duschek et al.

(10) Patent No.: US 7,144,470 B2
(45) Date of Patent: Dec. 5, 2006

(54) PROCESS AND DEVICE FOR PRODUCING ELECTRONIC ANTI-THEFT ELEMENTS

(75) Inventors: Detlef Duschek, Sensbachtal (DE); Gordon Klassen, Duarte, CA (US)

(73) Assignee: Checkpoint Systems International GmbH, Hirschborn (DE)

( * ) Notice: Subject to any disclaimer, the term of this patent is extended or adjusted under 35 U.S.C. 154(b) by 0 days.

(21) Appl. No.: 11/107,437

(22) Filed: Apr. 15, 2005

(65) Prior Publication Data

US 2005/0178320 A1 Aug. 18, 2005

Related U.S. Application Data

(62) Division of application No. 10/241,683, filed on Sep. 12, 2002, now abandoned, which is a division of application No. 09/319,244, filed as application No. PCT/EP97/06534 on Nov. 21, 1997, now Pat. No. 6,497,918.

(30) Foreign Application Priority Data

Dec. 6, 1996 (DE) ................................ 196 50 610

(51) Int. Cl.
*H01F 10/00* (2006.01)
*B32B 37/02* (2006.01)

(52) U.S. Cl. ...................... 156/259; 156/265; 156/271; 156/301; 156/302; 156/519; 156/522; 340/551; 340/541; 53/555; 53/435; 53/546; 53/548; 53/158

(58) Field of Classification Search ................ 156/259, 156/265, 271, 301, 302, 519, 522; 53/435, 53/158, 546, 548, 555; 340/551, 541
See application file for complete search history.

(56) References Cited

U.S. PATENT DOCUMENTS 3,609,858 A * 10/1971 Shaw et al. .................... 29/604
4,710,754 A 12/1987 Montean
4,829,288 A 5/1989 Eisenbeis
4,956,636 A 9/1990 Sansom et al.
5,020,581 A 6/1991 Gutierrez (Continued)

FOREIGN PATENT DOCUMENTS

DE 42 39 846 A1 6/1994

(Continued)

OTHER PUBLICATIONS

Patent Abstract of Japan, vol. 016, No. 046 (P-1307), Feb. 5, 1992—JP 03 250299A (Unikita Ltd.).

(Continued)

*Primary Examiner*—Linda Gray
(74) *Attorney, Agent, or Firm*—Caesar, Rivise, Bernstein, Cohen & Pokotilow, Ltd.

(57) ABSTRACT

This invention concerns a process and a device for producing strip elements for electronically securing articles and a corresponding produced strip element. The aim of the invention is to present a process, a device, and a strip element which can be economically produced according to said process. As for the process, the aim is achieved in that an endless strip of electronically detectable material is fed and is cut into individual segments of a defined length, in that the individual segments are advanced by means of a conveyor, the speed of which is greater than the speed at which the endless strip is fed, the relative velocity being adjusted to provide the desired interval between two consecutive strip segments, and in that the segments separated by intervals are given a coating on one or both sides.

7 Claims, 1 Drawing Sheet

U.S. PATENT DOCUMENTS

| | | | |
|---|---|---|---|
| 5,166,501 | A | 11/1992 | Woolley |
| 5,175,419 | A | 12/1992 | Yamashita |
| 5,313,191 | A | 5/1994 | Yamashita et al. |
| 5,313,192 | A | 5/1994 | Ho et al. |
| 5,353,010 | A | 10/1994 | Sanetra |
| 5,420,569 | A | 5/1995 | Dames et al. |
| 5,560,970 | A | 10/1996 | Ludebuhl uhl |
| 5,602,528 | A | 2/1997 | Witchger |
| 5,624,514 | A | 4/1997 | Frowein |
| 5,660,663 | A | 8/1997 | Chamberlain et al. |
| 5,909,177 | A | 6/1999 | Ruhrig |
| 6,275,156 | B1 | 8/2001 | Rasband |
| 6,497,918 | B1 | 12/2002 | Duschek et al. |
| 6,774,793 | B1 | 8/2004 | Brauer et al. |
| 6,780,265 | B1 | 8/2004 | Bleckmann et al. |
| 6,827,817 | B1 | 12/2004 | Bleckmann et al. |
| 2002/0163433 | A1 | 11/2002 | Rapp |

FOREIGN PATENT DOCUMENTS

| | | |
|---|---|---|
| EP | 0 153 286 A2 | 8/1985 |
| FR | 2 531 234 | 2/1984 |
| WO | WO 94/29503 | 12/1994 |

OTHER PUBLICATIONS

Patent Abstract of Japan, vol. 015, No. 331 (P- 1241), Aug. 22, 1991—JP 03 121598A (Unikita Ltd.).

* cited by examiner

PROCESS AND DEVICE FOR PRODUCING ELECTRONIC ANTI-THEFT ELEMENTS

CROSS-REFERENCE TO RELATED APPLICATIONS

This application is a divisional application of, and claims the benefit under 35 U.S.C. §121 of, application Ser. No. 10/241,683 (now abandoned), filed on Sep. 12, 2002, entitled PROCESS AND DEVICE FOR PRODUCING ELECTRONIC ANTI-THEFT ELEMENTS which, in turn, is a divisional application of, and claims the benefit under 35 U.S.C. §121 of, application Ser. No. 09/319,244 (now U.S. Pat. No. 6,497,918) filed on Jun. 7, 1999, entitled PROCESS AND DEVICE FOR PRODUCING ELECTRONIC ANTI-THEFT ELEMENTS, which, in turn, is a national stage application of, and claims the benefit under 35 U.S.C. §365(c) of, International Application No. PCT/EP97/06534 (now abandoned) filed on Nov. 21, 1997, entitled PROCESS AND DEVICE FOR PRODUCING ELECTRONIC ANTI-THEFT ELEMENTS, which, in turn, claims the benefit under 35 U.S.C. §365(b) of German Application No. 196 50 610.7, filed Dec. 6, 1996, and all of whose entire disclosures are incorporated by reference herein.

BACKGROUND OF THE INVENTION

1. Field of Invention

The present invention relates to a process and a device for producing strip elements for the electronic protection of objects, as well as to a strip element for the electronic protection of objects, produced by means of this process.

2. Description of Related Art

Goods in department stores and warehouses are electronically protected against theft in increasing numbers. A possibility of electronic theft protection consists in attaching strip elements, i.e. elongated metal pieces of low magnetic retentivity (for example VITROVAC of the firm Vacuumschmelze), to the goods. These strip elements trigger an alarm in appropriate monitoring systems, which customarily are arranged in the exit area of the protected establishment.

The electronic protection of goods can be roughly described as follows: a monitoring system has a transmitting and a receiving device. The transmitting device transmits an interrogation signal into a monitoring zone. The strip element is induced to send out a response signal, which is detected and identified by a receiving device. The appearance of the response signal is equated to the unauthorized passage of an electronically protected article through the interrogation zone, and the alarm is triggered. An example of a corresponding monitoring system is described in European Patent EP 0 123 586 A1.

The noted strip elements are customarily available either in label form, as hard tags or as protective elements coated with plastic. The protective elements coated with plastic are packaged, for example for protecting seed packages, directly in the packages, together with the seeds.

BRIEF SUMMARY OF THE INVENTION

An object of the present invention is to provide a process and a device, which minimize the production costs for correspondingly produced strip elements.

With respect to the process, this object is attained in that an endless strip of electronically detectable material is made ready and divided into individual strip sections of a desired length, the individual strip sections being moved on by means of a conveying device, whose speed is greater than the speed with which the endless strip is made available, wherein the relative speed is such that a desired distance between two successive strip sections is achieved, and that the spaced-apart strip sections are provided on one or both sides with a coating.

In accordance with an advantageous further development of the process of the present invention it is provided that the endless strip is initially split at least once in the longitudinal direction prior to being divided into individual strip sections of a desired length. This embodiment makes it possible to integrate the splitting of the material of low magnetic retentivity into strips of the width required for the strip elements into the production process—a cost-effective solution, since, as a result the amount of strip elements produced is considerably increased.

It has been shown to be advantageous if the strip sections (strip elements), which have been provided with a continuous coating on both sides (the coating can consist of the same material on both sides, but also of different materials), are wound on a storage roller. The strip elements provided in the form of rolled-up material then must be subsequently cut. An alternative solution proposes the integration of the division of the tape material into the production process.

In the case of several strip sections arranged parallel in respect to each other, it is provided with accordance with an advantageous further development of the process of the present invention to divide the tape material in the transverse, as well as in the longitudinal direction, so that at the end of the process the strip sections, which are provided with a coating on one side or on both sides, are directly available.

With respect to the device, the object is attained in that a supply roller is provided, on which an endless strip of electronically detectable material has been wound, in that a cutting device is provided, which divides the endless strip into individual strip sections of a desired length, in that a conveying device is provided, which has a higher speed than the supply roller from which the endless strip is unwound, so that the individual strip sections have a desired distance from each other, and in that a coating station is provided, which provides the individual strip sections with a continuous coating on one or both sides.

In accordance with a further development of the device of the present invention, a storage roller is provided, on which the strip sections, which have been coated on one or both sides, are wound. Alternatively, the strip sections, which have been coated on one or both sides, can be directly divided into the individual strip elements. A cutting station is provided for this purpose, which divides the strip sections, which have been coated on one or both sides, in the area between two successive strip sections. A remarkable advantage of the present invention doubtlessly resides in that it is no longer necessary to make the division of the tape materials into individual strip elements through the metal layer of low magnetic retentivity.

In accordance with an advantageous development it is proposed to integrate a longitudinal cutting device, which divides the endless strip of electronically detectable material at least once, into the device in accordance with the present invention. This step is cost-saving, since usually the tape material of low magnetic retentivity is produced so wide, that a division is necessary for reasons of cost.

If a longitudinal division of the material of low magnetic retentivity is performed, it is provided in accordance with an advantageous embodiment of the device in accordance with the present invention, that a separating station is included downstream of the longitudinal cutting device, which spatially separates the individual longitudinal strips of the endless strip.

In the case of a plurality of parallel produced strip elements, an advantageous further development of the device in accordance with the present invention provides, that the cutting station is designed in such a way, that it divides the strip sections, which are arranged spaced apart crosswise, as well as lengthwise, in the gaps which are free of strips.

It has been proven to be advantageous, if the conveying device is a conveyor belt, underneath of which a vacuum source is arranged, which fixes the individual strip sections in place on the conveyor belt in the desired positions. In case of magnetic materials it is alternatively provided that at least one magnet is arranged in relation to the conveyor belt, which fixes the individual strip sections in place on the conveyor belt in the desired positions.

With respect to the strip elements, the object is attained in that the strip element consist of a strip section of an electronically detectable material, which has been provided with a coating on one or both sides, wherein the coating on one or both sides extends past the strip section on all sides. Since the coating encloses the strip section on all sides, the latter does not come into contact with the goods to be protected, which may be required because of food regulations.

An advantageous embodiment of the strip element in accordance with the present invention proposes that the strip section made of a material of low magnetic retentivity, or of a material of low magnetic retentivity, on which individual sections of a hard or semi-hard magnetic material are arranged, and that the one-sided or all-sided coating is a plastic foil and/or paper, which is glued together. It is provided in particular, that the coating materials are materials, which can safely come into contact with food.

The invention will be explained in greater detail by means of the following drawing figures.

DETAILED DESCRIPTION OF PREFERRED EMBODIMENTS

Figures 1, 2:
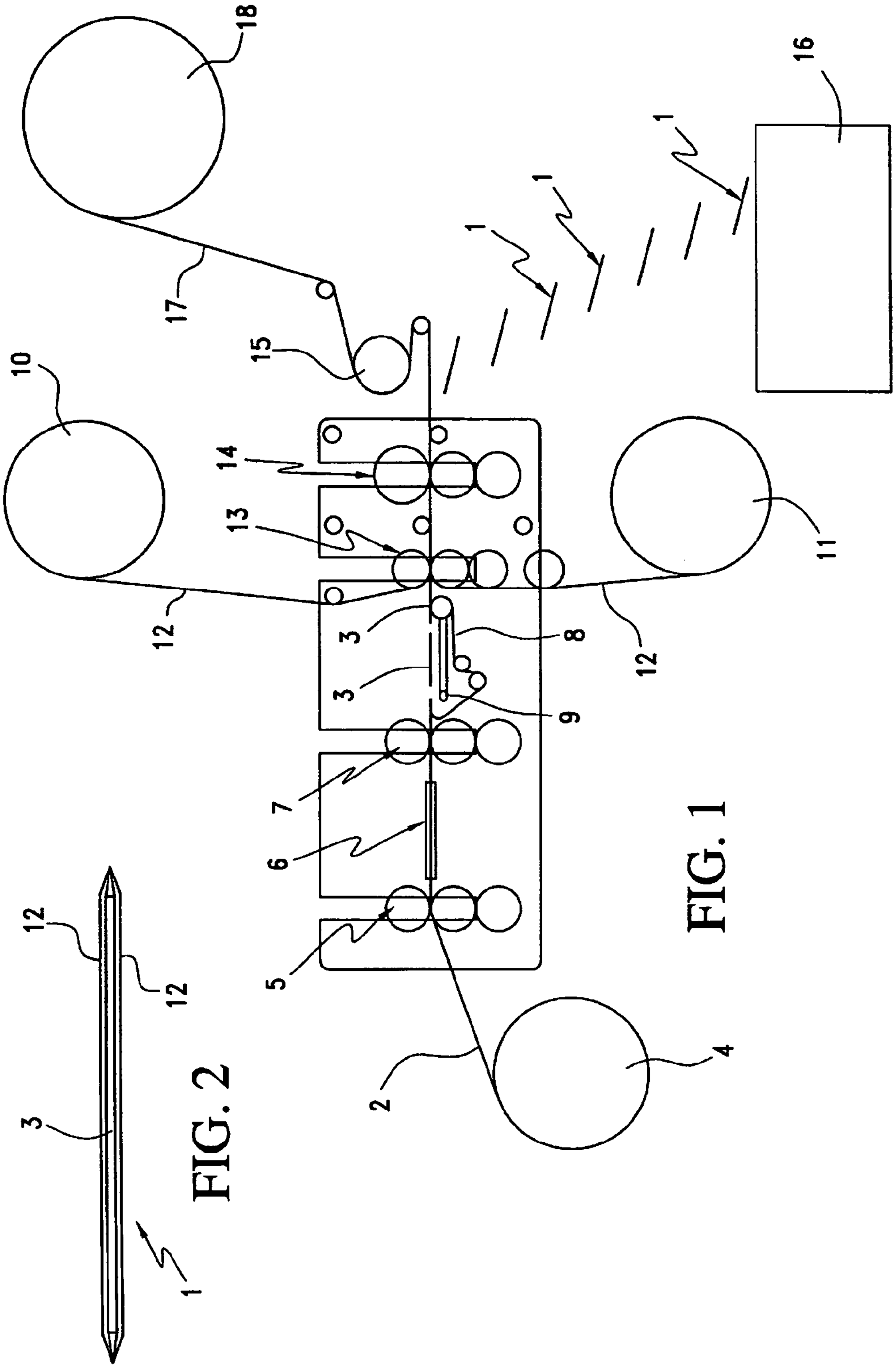
FIG. 1 is a lateral view of an embodiment of the device in accordance with the present invention.
FIG. 2 is a longitudinal sectional view through a strip element in accordance with the present invention.

FIG. 1 shows a lateral view of an embodiment of the device in accordance with the present invention. An endless strip 2, made of a material of low magnetic retentivity, is unwound from a supply roller 4 and is divided into endless strips of a defined width in a cutting station 5. The individual endless strips are pulled apart transversely to their direction of running in the separating station 6, so that they have a desired distance from each other when reaching the cutting device 7. The endless strips 2, which lie next to each other, are divided into individual strip sections 3 of a predefined length.

Subsequently, the strip sections 3 are conveyed on by a conveying device 13. This conveying device is a conveyor belt arranged in the running direction of the endless strip(s) 3. The strip sections 3 are fixed in a desired position on the moving conveyor belt by means of a vacuum source 9. Since the running speed of the conveyor belt is greater than the speed with which the individual strip sections 3 are provided via the cutting device 7, two successive strip elements 3 have a distance determined by the relative speed. In order to assure the adhesion of the strip sections on the conveyor belt, air holes are advantageously provided in the conveyor belt. As already mentioned before, the vacuum source 9 can be replaced by a magnet when transporting magnetic materials.

The strip sections 3 are conveyed by the conveyor belt into the laminating unit/coating station 13, and are provided there with a coating on both sides. The coatings are pulled off the supply rollers 10, 11.

In the cutting station 14, the coated tape materials is divided into individual strip elements 1 in the longitudinal and transverse direction. While the strip elements 1 are collected in a collection container 16, the remaining waste material 17 is wound on a storage roller 18.

A longitudinal section through the strip element 1 is represented in FIG. 2. The strip section 3 is enclosed on all sides by the coatings 12, i.e. the strip section 3 does not come into contact with the goods to be protected, which can be of extraordinary importance from a sanitary point of view.

As already mentioned, the coatings 12 can be different, but also the same materials. It is moreover provided that the strip section 3 is provided with a coating 12 on one side only, and thereafter is glued to a label with the uncoated side.

What is claimed is:

1. A device for producing strip elements for the electronic protection of objects, comprising:

a supply roller, on which an endless strip of electronically detectable material has been wound;

a longitudinal cutting device which divides the endless strip of electronically detectable material at least once into longitudinal strips;

a separating section provided downstream of the longitudinal cutting device which pulls apart the individual longitudinal strips of the endless strip transversely to their direction of running;

a cutting device which divides the longitudinal strips into individual strip sections of a desired length;

a conveying device which has a higher speed than the supply roller from which the endless strip is unwound, so that two successive strip sections have a desired distance from each other;

a coating section which provides coated tape material by providing the spaced apart strip sections with a continuous coating on both sides; and a cutting station which is designed in such a way, that it cuts the continuous coatings on both sides to divide the strip sections, which are arranged spaced apart crosswise, as well as lengthwise, in the gaps which are free of strip sections, into individual strip elements.

2. The device in accordance with claim 1, wherein the conveying device is a conveyor belt, underneath of which a vacuum source is arranged, which fixes the individual strip sections in place on the conveyor belt in desired positions.

3. The device in accordance with claim 1, wherein the conveying device is a conveyor belt, wherein at least one magnet is arranged in relation to the conveyor belt, which fixes the individual strip sections in place on the conveyor belt in desired positions.

4. The device in accordance with claim 1, further comprising: a collection container for collecting the strip elements.

5. The device in accordance with claim 1, further comprising: storage roller for winding up waste material.

6. The device in accordance with claim 1, wherein said coating section provides coating on said spaced apart strip sections with continuous coatings on both sides, and said continuous coatings on both sides are the same.

7. The device in accordance with claim 1, wherein said coating section provides coating on said spaced apart strip sections with continuous coatings on both sides, and said continuous coatings on both sides are different.

* * * * *